Jan. 4, 1927.
E. ANTHONY
1,613,261
COMBINED ELECTRIC PLUG AND CONTROLLER
Filed May 11, 1925
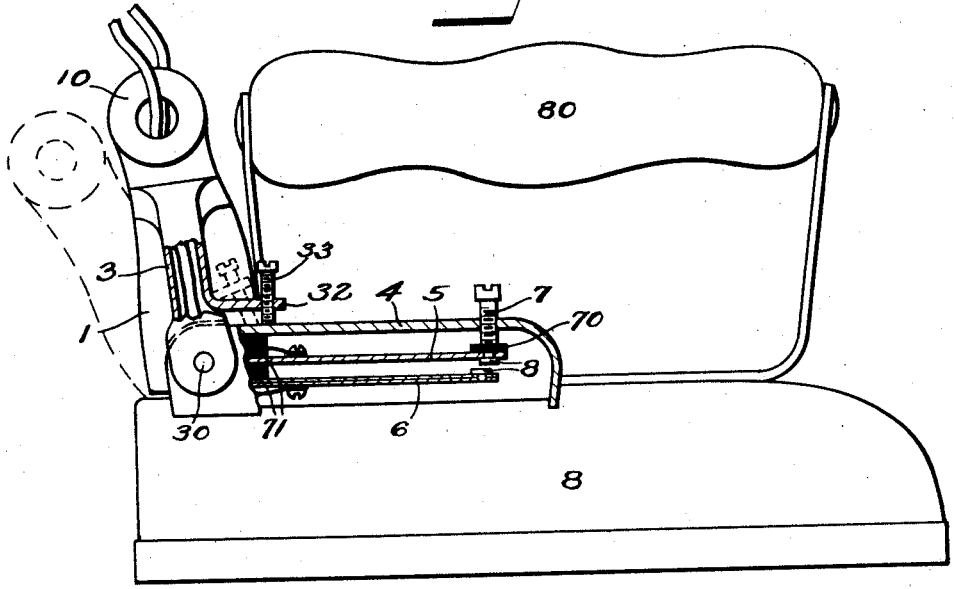
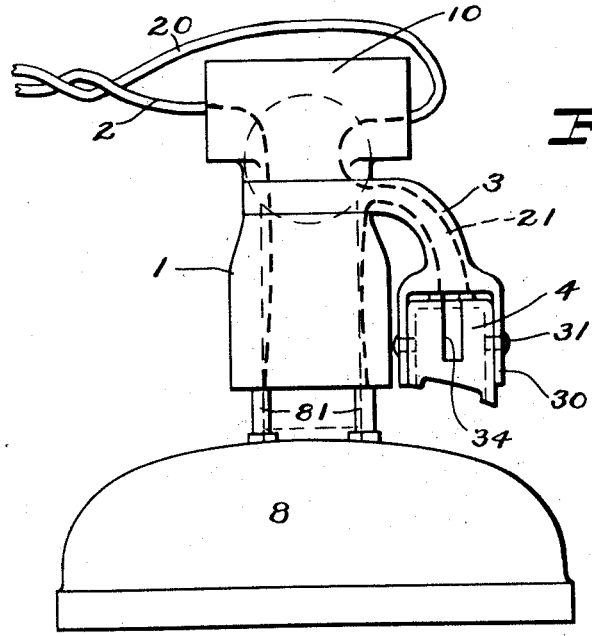
INVENTOR
Eugene Anthony
BY
H.L.&L. Reynolds.
ATTORNEYS Patented Jan. 4, 1927.

1,613,261

UNITED STATES PATENT OFFICE.

EUGENE ANTHONY, OF KING COUNTY, WASHINGTON.

COMBINED ELECTRIC PLUG AND CONTROLLER.

Application filed May 11, 1925. Serial No. 29,485.

My invention relates to a combination of an electric connecting plug and a thermostatic current controller adapted for use in connection with electrically heated tools and apparatus of various kinds.

The object of my invention is to so combine the electric plug with a thermostatic controller that the current will be automatically controlled to prevent overheating whenever the plug or connecting device is attached to the tool. My invention consists in mechanically connecting a thermostatic electric controller with a plug in such relation to the plug and to the tool to which it is to be applied so that when the plug is attached to the tool the thermostatic electric controller will be so positioned as to be affected by the heat generated in the tool to thereby cut off the flow of current whenever the temperature of the tool reaches that to which the controller has been adjusted.

The specific features of novelty and those upon which I desire to secure patent protection will be specifically set forth in the claims terminating this specification.

In the accompanying drawings I have shown my invention in the form of construction which adapts it for attachment to an electric iron. This has been done for the reason that the electric iron is probably the most numerous and most widely used of the various electrically heated tools.

Figure 1 is a side elevation of an electric iron having my device applied thereto, the electric controller and the arm which carries it being in section to better illustrate the operation of the device.

Figure 2 is a rear end elevation of the same iron with my device applied thereto, except that the plug and the electric controller is not seated down into its final position with relation to the iron, being kept raised in order more clearly to represent the relation between the two.

In the operation of electrically heated tools, of which the electric flatiron is the most widely known and used representative, it often happens that these are left with the current on and not in use, in which case the temperature in the iron or other tool will build up until it may eventually become red hot and will burn any combustible material with which it is in close contact. To prevent such a result I have connected a thermostatically operated electric controller with the plug so that whenever the plug is applied to the iron or other tool the electric controller is also applied to the tool in such relation that it is heated thereby and will act to turn off the current whenever the temperature reaches the point for which the controller has been adjusted. With such a device applied to an electric iron it may with impunity be left for an indefinite period resting upon a table or clothing, without danger of burning the same, unless the temperature at which it is ordinarily operated be sufficient to burn.

In the drawings 1 represents a connecting plug. This and the complemental member which is carried by the iron 8 may be of any standard or suitable type of construction. The type of construction illustrated employs two terminal rods 81 carried by the iron, which rods enter sockets carried by the plug. The current is received through the wires 2 and 20. The specific construction of these parts is immaterial in my invention.

Mounted upon the plug member 1 is an arm 3 which extends laterally and downward towards the body of the iron. Mounted upon this arm in such position that when the plug is applied to the iron the body thereof will be adjacent to and affected by the heat of the iron, is a thermostatic electric controller. This is shown as contained within a casing 4 and as being of the kind which employs two bars 5 and 6 connected together mechanically but insulated electrically at one end by the use of blocks 71 of insulating material.

One or both of these bars is of compound construction, consisting of two layers of metal having different coefficients of expansion. In the drawings the lower bar 6 is shown as of this construction, while the upper bar 5 is of a single material. The outer or free ends of these two bars carry terminal contact members 8, and an adjusting screw 7 which passes through the casing is adapted to engage an insulating block 70 carried by the arm 5 to thereby adjust the vertical position of the end of this bar and in this way adjust the temperature at which the controller will break the current. The two bars 5 and 6 are each connected with its respective end of the wire forming one side of the circuit leading to the heating elements in the iron. This wire passes through the arm 3, which is preferably made hollow, connects first with one of the bars, as 5, and then leads from the other bar 6 to the element which connects with one of the bars 81 of the iron.

The entire casing 4 of the circuit controller may, if designed only for one particular instrument, be fixedly secured with relation to the arm 3 and plug 1. If, however, the attachment is manufactured with the idea that it may be attached to various makes of instruments, it may be desirable to mount the controller upon the plug so as to be adjustable and thereby permit its being applied to irons or other tools having the plug connecting members differently mounted. To this end I have shown the casing 4 as being carried upon the arm 3 in such a manner that it may pivot thereon. This is done by giving the arm 3 two ears 30 which embrace one end of the casing 4 and thus permit it to be placed at various angles with relation to the arm and the plug 1. To secure holding the casing in the position which fits the iron upon which it is applied, I provide the arm 3 with a finger 32 which extends out over the casing 4 and extend an adjusting screw 33 therethrough, said screw engaging the top of the casing. In this way the position of the casing 4 relative to the plug may be adjustably fixed to whatever angle is desired. To accommodate also for the pivotal adjustment between the casing and the plug 1 provide the rear end of the casing with a slot 34 through which the electric wires may pass to and from the controller.

An attachment of this kind may be applied to any type of plug and by reason of the adjustability thereof it may be adjusted to fit plugs which occupy different angular positions with relation to the iron. By the use of a device of this sort the use of electric irons is rendered safe even if they be left with the current applied. They will be kept at the ironing temperature desired without at any time exceeding this temperature.

What I claim as my invention is:

1. A line connecting plug for electrically heated articles comprising a casing or frame member adapted to contain the line terminals, and a supplemental casing member hinged to the first mentioned casing member to permit its being placed alongside of and close to the body of the article to be heated, said second casing member being designed to hold a thermostatically operated switch which is connected in the heating circuit.

2. A plug adapted for the connection of a heating electric current with the article to be heated comprising terminal connections adapted for connecting with complemental terminals of the article to be heated and a thermostatic switch mechanism connected in the circuit and hingedly carried from the plug terminals in position to be adjusted in parallel juxtaposition with the article being heated.

3. The combination with a plug for connecting feed wires to an electrically heated tool of a thermostatic electric controller adapted to automatically open and close the heating circuit and pivoted by one end to the plug in position to be held against the face of the article being heated.

4. A plug for electric irons having an arm connected therewith and extending laterally and toward the face of the iron, and a thermostatic electric controller pivotally mounted upon said arm whereby it may be caused to lie close against the face of the iron, whatever the angular position of the plug.

5. The combination with an electric plug, an arm extending laterally from the plug and toward the face of the iron, a thermostatic electric controller pivoted upon said arm to swing against the face of the iron, said arm being hollow and accommodating the wires leading between the plug and the electric controller.

Signed at Seattle, King County, Washington, this 1st day of May, 1925.

EUGENE ANTHONY.